United States Patent
Paulucci (10) Patent No.: US 6,168,812 B1
(45) Date of Patent: *Jan. 2, 2001

(54) MICROWAVABLE SEMI-CIRCULAR PIZZA PRODUCT AND PACKAGING COMBINATION

(76) Inventor: Jeno F. Paulucci, 201 W. 1st St., Sanford, FL (US) 32771

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/844,111

(22) Filed: Apr. 29, 1997

(51) Int. Cl.$^7$ ..................................................... B65D 81/34
(52) U.S. Cl. ............................. 426/107; 426/90; 426/94; 426/124
(58) Field of Search ..................... 426/107, 234, 426/113, 128, 124, 94, 90

(56) References Cited

U.S. PATENT DOCUMENTS

| | | |
|---|---|---|
| D. 234,233 | 2/1975 | Silvestri . |
| D. 251,895 | 5/1979 | Belmuth et al. ................ D9/182 |
| D. 277,044 | 1/1985 | Kuhlman .......................... D1/130 |
| D. 332,030 | 12/1992 | Kauffman et al. . |
| D. 338,318 | 8/1993 | Jimenez et al. . |
| D. 339,899 | 10/1993 | Kittleson ......................... D1/122 |
| D. 354,613 | 1/1995 | Kreger . |
| D. 393,735 | 4/1998 | Paulucci . |
| D. 399,899 | 10/1998 | Sizemore, Jr. . |
| 628,449 | 7/1899 | Carr . |
| 969,173 | 9/1910 | Loose . |
| 1,174,826 | 3/1916 | Chapman . |
| 1,179,294 | 4/1916 | Embrey . |
| 1,646,921 | 11/1927 | Loose . |
| 2,089,396 | 8/1937 | Meilstrup . |
| 2,509,035 | 5/1950 | Corbett . |
| 2,668,767 | 2/1954 | Lowe . |
| 3,143,424 | 8/1964 | Wilson . |
| 3,235,390 | 2/1966 | Vischer, Jr. . |
| 3,677,769 | 7/1972 | King . |
| 3,845,219 | 10/1974 | Federico ............................ 426/19 |
| 3,880,069 | 4/1975 | Moline .............................. 99/483 |
| 4,020,184 | 4/1977 | Chesner ............................ 426/19 |
| 4,205,091 | 5/1980 | Van Horne ...................... 426/138 |
| 4,283,424 | 8/1981 | Manoski et al. .................. 426/94 |
| 4,283,431 | 8/1981 | Giordano et al. ............... 426/296 |
| 4,308,286 | 12/1981 | Anstett et al. ................... 426/19 |
| 4,308,952 | 1/1982 | Paulucci . |
| 4,313,961 | 2/1982 | Tobia ................................ 426/19 |
| 4,361,227 | 11/1982 | Paulucci . |
| 4,416,910 | 11/1983 | Hayashi et al. ................ 426/502 |
| 4,463,020 | 7/1984 | Ottenberg ......................... 426/19 |
| 4,551,337 | 11/1985 | Schmit et al. ................... 426/94 |
| 4,574,090 | 3/1986 | Paulucci .......................... 426/439 |
| 4,626,188 | 12/1986 | Morgenthaler et al. ........ 425/145 |
| 4,645,673 | 2/1987 | Wilmes ............................. 426/94 |
| 4,661,361 | 4/1987 | Mongiello et al. ............. 426/283 |
| 4,696,823 | 9/1987 | DeChristopher ................ 426/496 |

(List continued on next page.)

FOREIGN PATENT DOCUMENTS

| | | |
|---|---|---|
| 37 04 192 | 8/1988 | (DE) . |
| 2 241 863 | 9/1991 | (GB) . |
| WO 94/07369 | * 4/1994 | (WO) . |

* cited by examiner

Primary Examiner—Steven Weinstein
(74) Attorney, Agent, or Firm—Brinks Hofer Gilson & Lione (57) ABSTRACT

A microwavable pizza product and a package combination is disclosed herein. The package combination includes a pizza crust having a semi-circular shape and a pizza topping is deposited on top of the crust. The topped pizza crust is packaged with a microwave susceptor member under the bottom of the crust, and a support member under the susceptor member. A plastic film encloses the pizza product, susceptor member and support member, and the entire package is enclosed in a carton.

8 Claims, 5 Drawing Sheets

U.S. PATENT DOCUMENTS

| | | | |
|---|---|---|---|
| 4,753,813 | 6/1988 | Saadia | 426/283 |
| 4,842,735 | 6/1989 | Hollis et al. . | |
| 4,842,882 | 6/1989 | Paulucci | 426/439 |
| 4,891,482 | 1/1990 | Jaeger et al. . | |
| 4,907,501 | 3/1990 | Rijkaart | 99/450.1 |
| 4,940,867 * | 7/1990 | Peleg | 426/107 |
| 5,071,062 | 12/1991 | Bradley et al. . | |
| 5,104,669 | 4/1992 | Wolke et al. | 426/94 |
| 5,162,126 | 11/1992 | Thorner et al. . | |
| 5,180,603 | 1/1993 | Moriya et al. | 426/556 |
| 5,182,123 | 1/1993 | Edo et al. | 426/19 |
| 5,194,273 | 3/1993 | de Bruijne et al. | 429/94 |
| 5,196,223 | 3/1993 | Nakamura | 426/503 |
| 5,247,149 | 9/1993 | Peleg . | |
| 5,256,432 | 10/1993 | McDonald et al. . | |
| 5,268,188 | 12/1993 | Diem et al. | 426/502 |
| 5,348,751 | 9/1994 | Packer et al. | 426/94 |
| 5,405,626 | 4/1995 | Van Der Graaf et al. | 426/94 |
| 5,417,150 | 5/1995 | Kordic | 99/432 |
| 5,417,996 | 5/1995 | Brink | 426/502 |
| 5,529,799 | 6/1996 | Bornhorst et al. | 426/549 |
| 5,560,946 | 10/1996 | Sanders et al. | 426/94 |
| 5,585,027 | 12/1996 | Young . | |
| 5,688,427 * | 11/1997 | Gallo, Jr. | 426/107 |
| 5,968,570 | 10/1999 | Paulucci . | |

GENERAL PROCESS DESCRIPTION

MICROWAVABLE SEMI-CIRCULAR PIZZA PRODUCT AND PACKAGING COMBINATION

BACKGROUND OF THE INVENTION

The present invention relates to prepared frozen food products and methods for making such products. In particular, the invention relates to a microwavable pizza product and a method for making same.

Frozen food products, such as frozen pizzas, have made it convenient and time-efficient for the consumer to cook large-portioned, restaurant-style food products. Large, uncooked frozen pizzas have traditionally required heating or baking in a household convection oven for up to 40 minutes before the pizzas are ready for consumption. While this amount of cooking time is relatively short compared to preparing a pizza from scratch, consumers have generally desired frozen products that require even less time to prepare.

Microwave ovens and conventional ovens have provided a convenient means for heating a variety of frozen food products in a shorter amount of time. Within this category of frozen food products, frozen store-bought pizzas continue to be a popular microwave-heatable item for consumers. While these products may offer the consumer a wide variety of toppings in smaller, microwave-sized service portions, a traditional, larger-sized round pizza shape does not lend itself to heating in a common microwave oven. Indeed, even if a larger-sized frozen pizza is able to be placed in a microwave oven, it is often very difficult to achieve thorough cooking and heating of the pizza. Because microwave ovens tend to cook flat items such as pizzas from the outside perimeter in towards the center, the center of a large round pizza is often still frozen and uncooked by the time the perimeter of the pizza is fully cooked. Further microwave heating of the pizza to cook the center will result in overcooking the perimeter.

Thus, when the consumer desires a larger-sized portion of pizza for service to a large number of people, slower-cooking, large-sized pizzas are presently the best available option. The consumer can alternatively prepare several smaller-sized microwave portions to save time, but the small portions are not as aesthetically pleasing as a larger, circular traditional pizza.

In general, with respect to frozen pizzas, items of the thin-crusted variety tend to more generally favored if the crust has a crispy quality when cooked. These characteristics are easily accomplished in a conventional oven due to such an oven's direct surface heating and drying effects. In microwave ovens, however, excess moisture within the frozen crust often causes it to become soft and soggy. Excess liquid within the filling also causes this problem. After prolonged exposure to microwave energy, the crust becomes tough and unpalatable, with the crumb of the crust becoming rubbery and gummy. The significant heating that is often required of a larger microwavable pizza often compounds this result.

Various attempts have been made to overcome the problems associated with exposure of pizza crusts to microwave energy. These improvements, however, have been only minimally successful. For example, dough formulas have been manipulated to make them homogeneously higher in shortening content and eggs. The inclusion of these additional ingredients slows the crust's absorption of microwave energy. These types of crusts do not have a pleasant taste or texture.

SUMMARY OF THE INVENTION

It is therefore an object of the present invention to provide an improved frozen pizza product and package configuration to allow for efficient microwave heating.

It is another object of the present invention to provide a pizza product which is configured to serve a larger number of people than an individual-sized pizza.

It is still another object of the present invention to provide a pizza product and package combination that allows for a crisp crust upon heating in a microwave oven.

It is still another object of the present invention to provide a pizza product and package combination that allows for efficient storage and service of the product.

In one aspect of the present invention, a pizza product and package combination is provided. The combination includes a pizza crust having a semi-circular shape whereby the crust has one edge which is arcuate in configuration and another edge which is substantially straight in configuration and a pizza topping material disposed on the top of the crust. A microwave susceptor member is positioned under the bottom of the crust, and a support member is positioned under the susceptor member. Both the support member and the susceptor have a semicircular shape substantially corresponding to the shape of the crust. The pizza product, susceptor and support member are together encased in a plastic film and placed within a packaging carton. The particular packaging configuration, along with the semi-circular shape of the dough of the pizza, allows for superior and efficient microwavability, while producing pleasing results for the final product.

In another aspect of the present invention, a pizza product and packaging combination is provided wherein the pizza product includes a pizza crust having a substantially semi-circular shape including a straight edge and a curved edge with the body of the pizza crust forming a central portion. The crust incorporates alternating layers of fat and dough, with the central portion of the crust having a plurality of perforations extending therethrough. The pizza topping material is disposed on top of the central portion of the crust, and the top of the central portion defines a peripheral area which is free of pizza toppings. A susceptor member is positioned under the bottom of the crust. The pizza product including the layered dough, susceptor packaging, and the semi-circular overall shape of the combination provides for exceptional qualities of the product upon heating in a microwave oven.

Furthermore, the pleasing size and shape of the pizza products that are incorporated into the invention allow larger numbers of consumers to enjoy several types of pizza toppings. The disadvantage of small, individual size pizzas is averted by using the visibly larger semicircular shape, which allows users to visually or manually combine the semicircular shapes into larger, whole round pizzas for consumption by larger groups.

These and other features and advantages of the invention will become apparent upon review of the following detailed description of the presently preferred embodiments of the invention, taken in conjunction with the appended figures.

DESCRIPTION OF THE DRAWINGS

The invention will be explained with reference to the drawings, in which.

DETAILED DESCRIPTION OF THE INVENTION AND THE PRESENTLY PREFERRED EMBODIMENTS

A description of the laminated dough used in the preferred embodiment of the invention will be presented first, followed by a description of the shaping, cutting and assembly steps of the preferred embodiment.

Figure 1:
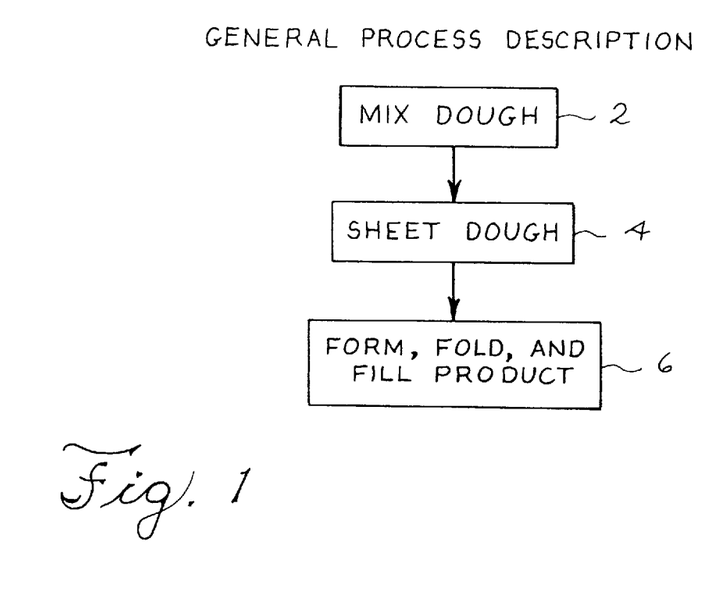
FIG. 1 shows a high-level flow chart of the process for making a laminated dough and crust used in the preferred embodiments of the present invention.

In accordance with the preferred embodiment of the present invention, the method for making the laminated dough used in the present embodiment of the pizza product is shown generally in FIG. 1. As shown in the figure, a dough is first mixed (2), then sheeted to form a workable pastry dough (4), and finally formed, filled and folded (6) to form the final dough product.

Figure 2:
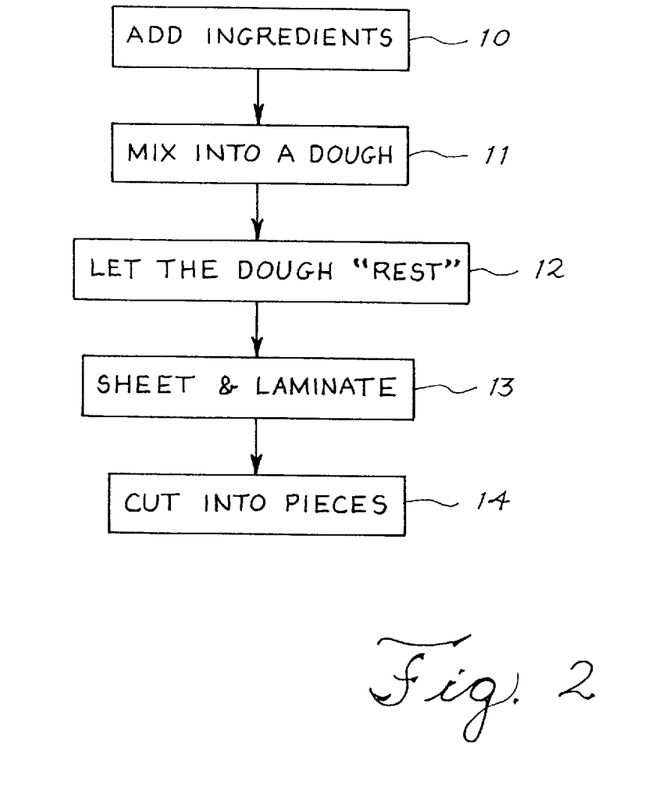
FIG. 2 shows a high-level flow chart of the process for producing the dough mixture used in the present invention.

Specifically, as shown in FIG. 2, after ingredients for the dough are mixed (10–11), the dough is allowed to rest a period of time (12). After this resting period, a sheeting and laminating process (13) is performed on the rested dough to produce a layered sheet of dough and fat. The dough is finally cut into pieces for final forming (14).

The following example shows the ingredients used in the manufacture of a dough in accordance with the present invention. The crust mixture which is used in the preparation of the laminated crust includes approximately 60% by weight of a flour having a protein content of approximately 12%. 1.83% by weight of active dry yeast is also added, along with 1.22% salt, 1.22% sugar, and 32% water at a temperature between 50 and 60 degrees F (all percentages are by weight of total dough). A dough conditioner is added in a quantity of about 3% by weight. The conventional dough conditioner, preferably of the type manufactured by Microgold, stabilizes the mixture. A table summary of these ingredients in an example batch (quantitized by weight of ingredients) is listed below.

| Ingredient | Pounds |
| --- | --- |
| Flour-11% Protein | 100 |
| Yeast-Dry Instant Active | 3 |
| Salt | 2 |
| Sugar | 2 |
| Margarine-Uncolored, Solid | 2 |
| Water | 52 |
| Microgold Dough Conditioner | 5 |
| Hi-melt Margarine Roll-In % | 10% |

Figure 3:
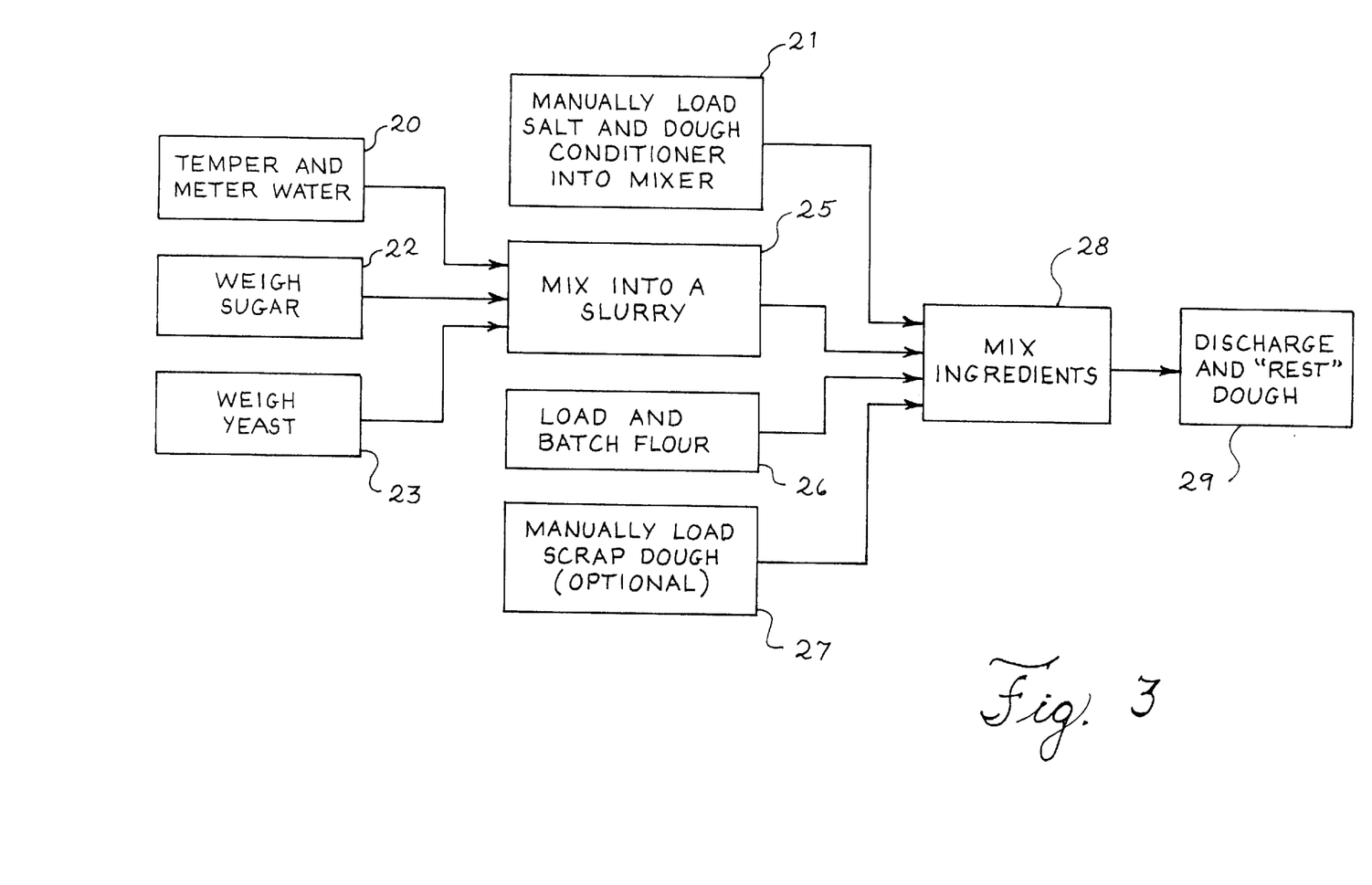
FIG. 3 shows a more detailed flow chart of the dough-mixing process used in the present invention.

As shown in the flow diagram of FIG. 3, selected ingredients are first weighed (boxes 20, 22 and 23 in the flow diagram), and the water, sugar, and yeast are mixed into a slurry (25). The water used at box 20 is filtered water brought to the specified temperature. The slurry solution is then mixed and pumped to a use tank. The measured flour, slurry, salt and dough conditioner are then loaded (21, 25–26) and mixed together (28). Scrap dough may be added as well (27). The mixing occurs at high speed for 2 to 3 minutes until a preferred target temperature of approximately 80–89 degrees F. is reached. After mixing, the dough is discharged onto an incline conveyor belt and conveyed slowly for 45 minutes to 1 hour (29 in FIG. 3, 12 in FIG. 2). This "resting" or "proofing" stage allows the yeast in the dough to activate and cause the dough to rise.

As shown in FIG. 2, following the resting period 29 the sheeting and laminating process 13 is performed on the dough. This process is illustrated by the flow diagram of FIG. 4. As shown in this figure, various cutting, rolling, piling and stretching operations are performed on the dough.

Figure 4:
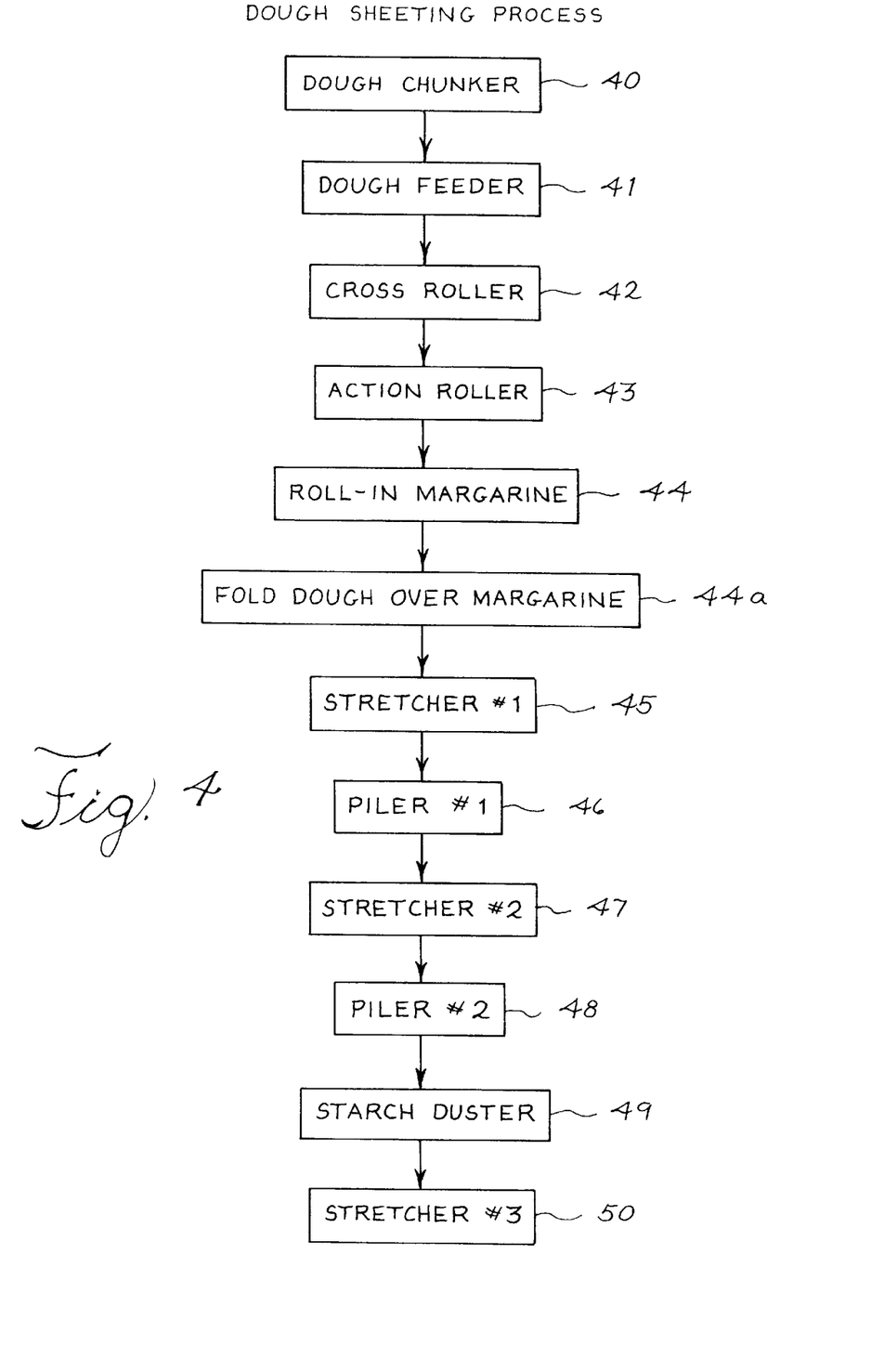
FIG. 4 shows a flow chart of the process for sheeting and laminating the dough used in the present invention.

In particular, at box 40 in the flow diagram, a dough chunker divides the dough into approximately 60-pound chunks in order to properly load a dough feeder. At 41, the dough feeder receives the chunks of dough dumped into a hopper. The conventional feeder uses a belt and cutting blade to deposit overlapping dough strips on a moving conveyor. The line of strips measures 35–50 mm thick and 480–570 mm wide. A roller is next run across the overlapped dough to spread and even the distribution of the dough (42). The dough is then run through three sets of high-speed rollers to gently work it into a thin sheet 6.5–8 mm thick (43).

High-melt margarine at a temperature between 65 and 71 degrees F. is extruded through a rectangular nozzle into a strip on the middle third section of the dough sheet (44). The quantity of margarine added by weight is equal to 15% of the total weight of the dough. The outer portions of the dough are then folded in overlapping thirds, thus sandwiching the margarine in the middle of the dough and forming a fatted dough (44a).

The fatted dough is then stretched by a first stretcher at 45. In this operation, a series of rollers are rotated in a circular fashion. The dough passes underneath these rollers on three different conveyors at a speed determined by a speed ratio setting. This setting in combination with the clearance between the rollers and the belt determines the final thickness of the dough after the rolling.

As shown in box 46, the fatted dough is "piled" by a first piler to create a first series of layers. Preferably, the piler travels back and forth distributing the dough onto a conveyor belt situated at a 90 degree angle from the direction of feed. The conveyor is thus loaded with a sheet of dough having overlapping folds. The number of folds across the width of the dough sheet is multiplied by two to determine the number of layers presently in the dough. The dough is then stretched by a second stretcher at 47 into a fatted sheet, and piled by a second piler at 48 to create a layered sheet having a thickness between 15 and 20 mm. At this point, the dough sheet has its final sixteen-layer structure. To facilitate the handling and manipulating of the sheet in further process steps, a dusting of starch or flour is made to the underside of the sheet at 49. Finally, at 50, a third stretcher rolls the dough to a final thickness of 3–5 mm.

In order to determine the total number of layers the dough will eventually have, the number of layers present after the first piler is multiplied by the number of layers present after the second piler. For example, if 4 layers are run after the first piler and 4 layers are run after the second piler, the dough sheet will have a total of approximately 16 layers.

Figure 5:
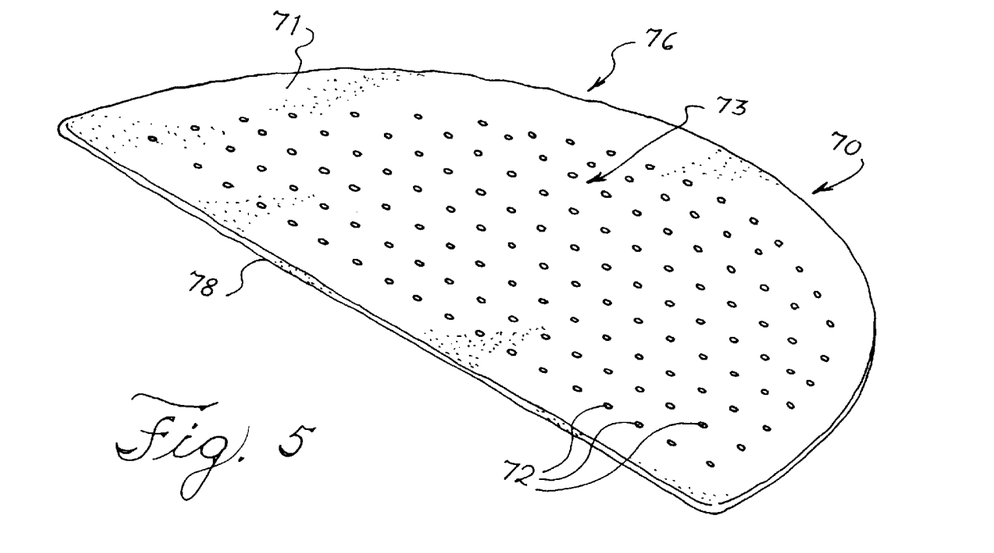
FIG. 5 shows one embodiment of the pastry product shape which is incorporated into the present invention.

After the final thickness is achieved, the dough sheet is cut into semi-circular shapes as shown in FIG. 5. The dough sheet is first cut using a sealing cutter to the semi-circular shape 70, which includes an arcuate, curved edge 76 and a substantially straight edge 78. The cutter cuts the layered dough preferably in a fashion that seals or pinches the edges together to prevent delamination of the dough at the edges 76 and 78 during baking or consumption.

Preferably, before or after cutting, the dough is "docked" or punctured in the central portion 73 to prevent the dough from expanding or "ballooning" in the oven at the central portion 73. The puncturing is performed by a roller with a large number of projecting pins to punch a pattern of preferably evenly-spaced holes through the dough. The perforated central portion 73 is preferably roughly centered within the edges 76 and 78, and a peripheral portion 71 which is substantially free of punctures is defined between the edges 76 and 78 and the edge of the central portion 73. In order for the docking roller to perforate only the central portions of the shaped dough 70, the docking roller must be precisely oriented and timed with the cutter and conveyor.

The processing machinery preferably used in the described process is as follows. The high-speed dough mixer is a Model TK160, preferably manufactured by Stephan. The sheeting and laminating system preferably comprises components manufactured by Rheon, and include the following components and model numbers: Surface Cleaner Model SV013, Sheet Folder Model FF111, Stress Free Stretcher Model SM231, Flour Duster Model DF103, Dough Feeder Model EX050 Underneath Conveyor Model PC502, CWC Cross Action Roller Model M103, Fat Pump Model XC230, Roll-In Conveyor Model WC303, Sheet Folder Model FF101, Stress-Free Stretcher Model SM501, Pile-Up Table Model PC011, Parallel Piler Model LM608, Pile-Up Table Model PC103, Cross Roller Model CM523, Flour Sweeper Model FV376, Stress-Free Stretcher Model SM318, Circular Cutter Model OK833, Spacing Conveyor Model 2C672, Press Roller Model MR308, Single Rotary Cutter Frame Model RK013, Synchronized Conveyor Model MC013, and Guillotine Cutter Model GK013. The various ranges settings for these devices are shown in the table below.

| | Low | High |
|---|---|---|
| Mixer | | |
| Mix Time (seconds) | 100 | 180 |
| Dough Chunker | | |
| Intervals per minute | 2 | 5 |
| Dough Feeder | | |
| Flour Setting # 1 (Beginning of Line) | 10 | 30 |
| Dough Intervals | 230 | 280 |
| Flour Setting # 2 (Before Cross Roller) | 10 | 30 |
| Cross Roller Gage (mm) | 15 | 40 |
| Action Roller | | |
| Flour Setting # 3A (Top of Action Roller) | 0.5 | 1.5 |
| Flour Setting # 3B (Bottom of Action Roller) | 10 | 30 |
| Roller Gage (mm) | 4 | 7 |
| Set Dough Width (mm) | 650 | 725 |
| Output Belt Speed (m/min) | 1.00 | 2.75 |
| Stretch Ratio | 2 | 4 |
| Roll-In | | |
| Belt Speed (m/min) | 1.0 | 2.8 |
| Screw Speed (rpm) | 0.2 | 1.15 |
| Stretcher # 1 | | |
| Flour Setting # 4A (Top of Stretcher # 1) | 20 | 35 |
| Flour Setting # 4B (Bottom of Stretcher # 1) | 10 | 30 |
| No. 1 Belt Speed/Incline Angle | 1.0/15 | 2.75/40 |

-continued

| | Low | High |
|---|---|---|
| | deg. | deg. |
| Speed Ratio | 2.5 | 4.5 |
| Roller Clearance (mm) | 0.8 | 2.0 |
| Number of layers after Piler # 1 | 2 | 6 |
| Folding Width (mm) | 25/25 | 40/40 |
| Piler Belt Speed | 300 | 700 |
| Flour Setting # 5 (After Piler # 1) | 10 | 20 |
| Stretcher # 2 | | |
| Flour Setting # 6A (Top of Stretcher # 1) | 10 | 40 |
| Flour Setting # 6B (Bottom of Stretcher # 1) | 15 | 35 |
| Gage (mm) | 0.8 | 3 |
| Speed Ratio | 2.0 | 6.0 |
| Input Thickness (mm) | 15 | 25 |
| Belt # 1 Speed (m/min) | 1 | 3 |
| Number of layers after Piler # 2 | 2 | 6 |
| Folding Width (mm) | 650 | 700 |
| Piler Belt Speed | 4 | 14 |
| Flour Setting # 7 | 1 | 3 |
| Flour Setting # 8 (After Piler # 2) | 0.8 | 2 |
| Stretcher # 3 | | |
| Flour Setting # 9A (Top of Stretcher # 3) | 1 | 2.5 |
| Flour Setting # 9B (Bottom of Stretcher # 3) | 10 | 50 |
| Belt # 1 speed (m/min) | 0.5 | 2.5 |
| Speed Ratio | 2 | 5 |
| Crank Clearance (mm) | .05 | 5 |
| Gas Impingement Oven | | |
| Bake Time (minutes) | 4 | 6 |
| Oven # 1 Temp (deg. F.) | 375 | 525 |
| Oven # 1 Fan (% of maximum) | 10 | 50 |
| Oven # 1 Height (inches) | 1.5 | 3.5 |
| Oven # 2 Temp (deg. F.) | 350 | 500 |
| Oven # 2 Fan (% of maximum) | 10 | 50 |
| Oven # 2 Height (inches) | 1.5 | 4.5 |
| Baffles (Top/Bottom) | 0/100 | 80/20 |

The preferred parameters for various dough dimensions and temperatures are summarized below. These ranges are useful when the process of forming the present invention is performed on alternative equipment. The present invention is not limited to these parameters, although those listed have been found to be optimal for the equipment used.

| | Low | High |
|---|---|---|
| Room Temperature (deg. F.) | 60 | 70 |
| Yeast Solution Temperature (deg. F.) | 50 | 65 |
| Dough Temperature after mix (deg. F.) | 80 F. | 89 F. |
| Dough Width after feeder (W1-mm) | 480 | 570 |
| Dough Thickness (T1-mm) | 35 | 50 |
| Dough Temperature (deg. F.) | 75 F. | 85 F. |
| Dough Width before butter roll-in (W2-mm) | 650 | 800 |
| Dough Thickness before butter roll-in (T2-mm) | 5 | 8 |
| Roll-In Temperature (deg. F.) | 55 F. | 80 F. |
| Dough Width after butter roll-in (W3-mm) | 280 | 320 |
| Dough Thickness after butter roll-in (T3-mm) | 20 | 30 |
| Dough Width after stretcher #1 (W4-mm) | 300 | 400 |
| Dough Width after 1st Piler (W5-mm) | 300 | 350 |
| Dough Thickness after 1st Piler (T5-mm) | 12 | 25 |
| Dough Width after stretcher #2 (W6-mm) | 250 | 350 |
| Dough Width after 2nd Piler (W7-mm) | 600 | 700 |
| Dough Thickness after 2nd Piler (T7-mm) | 15 | 20 |
| Dough Width after stretcher #3 (W8-mm) | 600 | 700 |
| Final Dough Thickness (T8-mm) | 2.5 | 5 |

The various stretching and rolling procedures using the above preferred parameters result in a unique 16-layer laminated dough with excellent taste and texture. The resulting pizza crust is crispy and is able to withstand topping, freezing, and microwaving without any significant degradation in these qualities.

Figure 6:
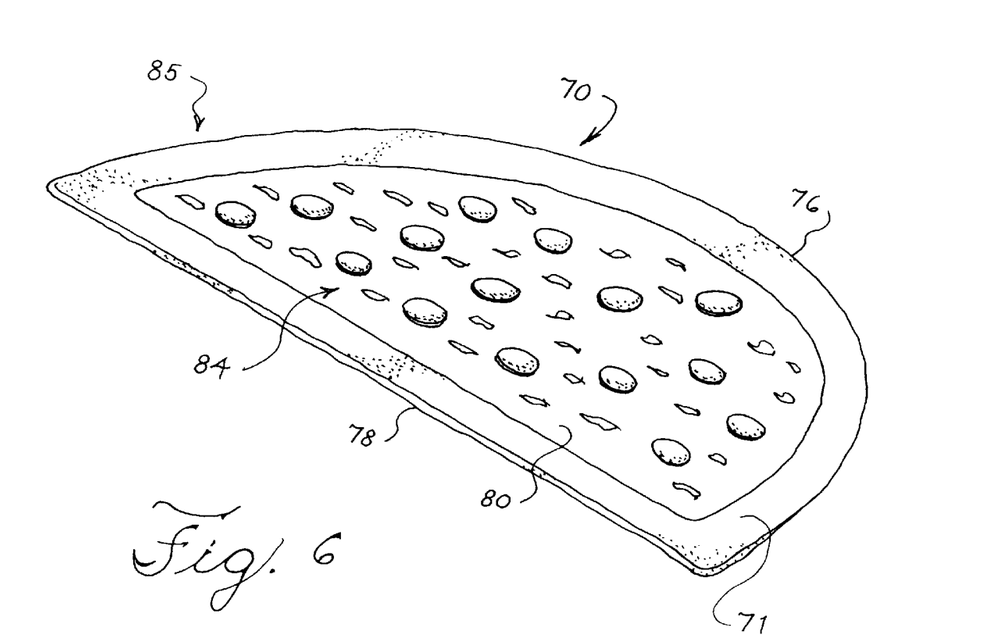
FIG. 6 shows the embodiment of FIG. 5 including pizza toppings disposed thereon in accordance with the present invention.

Referring now to FIG. 6, the laminated, multi-layered dough shape 70 is topped with pizza toppings 80, such as tomato sauce, mushrooms, sausage, pepperoni, onions or cheese to complete the pizza product 85. Preferably, the toppings are deposited in the central, docked portion 73 of the shape 70 to form a topping portion 84. The topping portion 84 is preferably defined away from the edges 76 and 78 of the crust, leaving the peripheral portion 71 free of toppings. As with the docking procedure above, the conventional filling-depositing apparatus used to accomplish the topping of the pizza shapes 70 will need to be timed with the cutter, docking roller and conveyor to accurately deposit the toppings in the central portion 73. Finally, the pizza products are spaced apart on a conveyor and baked or partially baked in gas-impingement ovens before being frozen.

Figure 7:
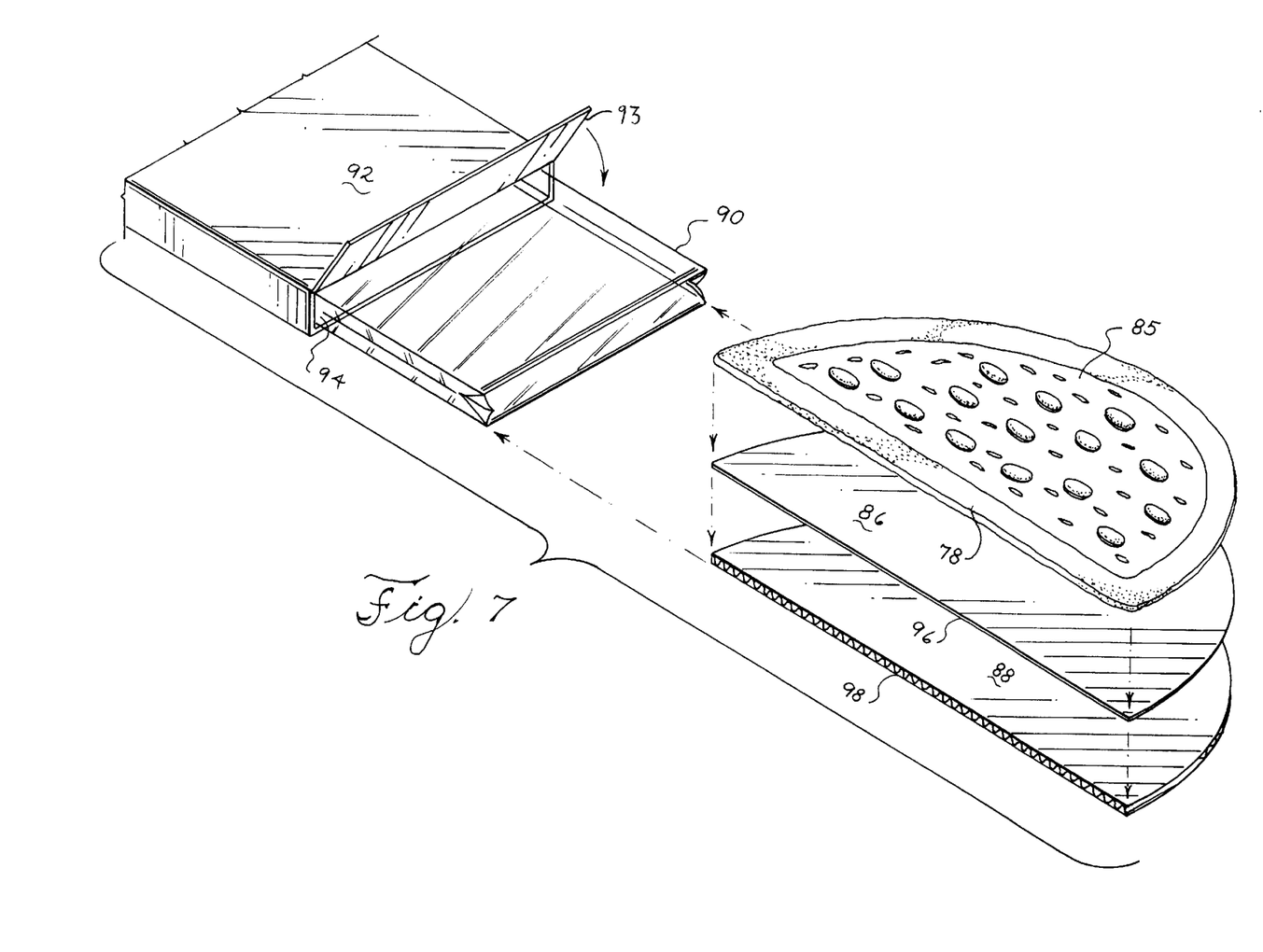
FIG. 7 is an expanded perspective view showing the embodiment of FIGS. 5 and 6 incorporated into packaging of the present invention.

The packaging of the preferred embodiment of the present invention to facilitate the microwaving of the pizza product 85 is shown in the exploded diagram of FIG. 7. As shown in the diagram, the frozen pizza product 85 is packaged with various support and packaging materials configured to allow the most efficient reheating of the pizza. Preferably, a microwave-active susceptor sheet 86 is provided and cut into a semi-circular shape closely matching the shape of the pizza product 85. The straight edge 96 of the susceptor sheet 86 is aligned with the straight edge 78 of the pizza product 85 and placed directly adjacent the underside of the crust 70 of the pizza product 85. The most sensitive susceptor side is placed facing the crust 70.

The pizza product 85 and the susceptor sheet 86 are supported by a support member 88, which is also formed into a semi-circular shape to correspond substantially with the shape of the pizza product 85. The support member 88 is placed underneath the susceptor sheet 86, also with its straight edge 98 aligned with the straight edges 96 and 78 of the susceptor sheet 86 and pizza product 85, respectfully. In the alternative, the susceptor sheet may be bonded to the support member 88 or otherwise laminated thereto.

The pizza product 85, susceptor sheet 86 and the support member 88 are held together by plastic film 90, which is wrapped around these items and sealed. Preferably, the plastic film is shrink-wrapped and removed by the consumer before reheating the pizza. In the alternative, the plastic film 90 may be vented to release steam and allowed to remain over the pizza product 85 during reheating in a microwave oven. In some cases, this configuration may allow more rapid heating of the topping materials due to the accumulation of steam and heat beneath the plastic. Of course, a microwave-transparent and heat-resistant film must be used in the latter configuration.

Finally, the wrapped pizza product 85, the susceptor 86, and the support member 88 are placed inside a packaging carton 92 as shown in FIG. 7. The carton 92 is preferably narrow and fitted closely to the shape of the pizza product 85 to allow it to serve as a platform for microwaving the pizza product 85. In the alternative, the carton 94 may be used as a chamber or container for microwaving the pizza product 85 within the carton.

When the user heats the pizza product 85 in a conventional microwave oven, the susceptor 86 heats to a very high temperature and provides a hot surface for crisping the underside of the crust 70. The semicircular shape of the pizza allows microwave energy to heat the pizza in an efficient manner, with the pizza becoming cooked from the outer edges 78 and 76 inward toward the central portion 73. The unique shape allows for the efficient heating of large-size semicircular pizzas that may later be combined "at the table" into larger, more conventional-looking circular pizzas.

The combination of the flaky laminated dough sheet with the particular semicircular structure as described herein provides a structurally stable, yet flaky and appealing pizza product that heats efficiently in the microwave oven. When the product is combined with the packaging and susceptor members as described above, an exceptionally crisp and flaky crust is obtained in a unique and eye-pleasing configuration.

Of course, it should be understood that a wide range of changes and modifications can be made to the embodiment of the method and product described above. For example, variations in the ingredients, temperature parameters, layering steps, topping steps and packaging steps may be incorporated while remaining within the contemplated scope of the present invention. Furthermore, slight variations in the overall shape of the pizzas may also be incorporated while remaining within the contemplated scope of the invention. It is therefore intended that the foregoing detailed description be regarded as illustrative rather than limiting and that it be understood that it is the following claims, including all equivalents, which are intended to define the scope of this invention.

What is claimed is:

1. A frozen, microwaveable packaged pizza product, comprising:

a) a frozen, baked or partially baked, laminated pizza crust having a semi-circular shape wherein the crust has one edge which is arcuate in configuration and another edge which is substantially straight in configuration, said crust comprising a peripheral portion adjacent both of said edges and a central portion within the peripheral portion, said semi-circular shape allowing the efficient microwave heating of said pizza product from said edges of said crust toward the central portion of said crust within said edges;

b) frozen pizza topping material on top of said crust on said central portion, said peripheral portion adjacent both of said edges being free of topping material;

c) a microwave susceptor member having a semi-circular shape corresponding substantially to the shape of the pizza crust and disposed under the bottom of said crust;

d) a support member under said susceptor member, said support member having a shape substantially corresponding to the shape of said crust;

e) a plastic film enclosing said pizza product, said susceptor member and said support member; and f) said plastic film enclosed pizza product, susceptor member and support member being disposed in a packaging carton sized to closely contain said pizza product.

2. The pizza product and package combination of claim 1 wherein:

g) said pizza crust comprises multiple layers of dough.

3. The pizza product and package combination of claim 2 wherein:

h) said pizza crust comprises at least 16 alternating layers of dough and fat.

4. The pizza product and package combination of claim 3 wherein:
   i) said crust has a plurality of punctures in it extending substantially through said crust.

5. The pizza product and package combination of claim 1 wherein:
   g) said susceptor member is secured to said support member by an adhesive.

6. The pizza product and package combination of claim 1 wherein:
   g) said susceptor member is laminated to said support member.

7. The pizza product and package combination of claim 1 wherein:
   g) said carton comprises a microwave-transparent material.

8. The pizza product and package combination of claim 1 wherein:
   g) said pizza crust and pizza topping material are microwaveable.

* * * * *